Figure 1:
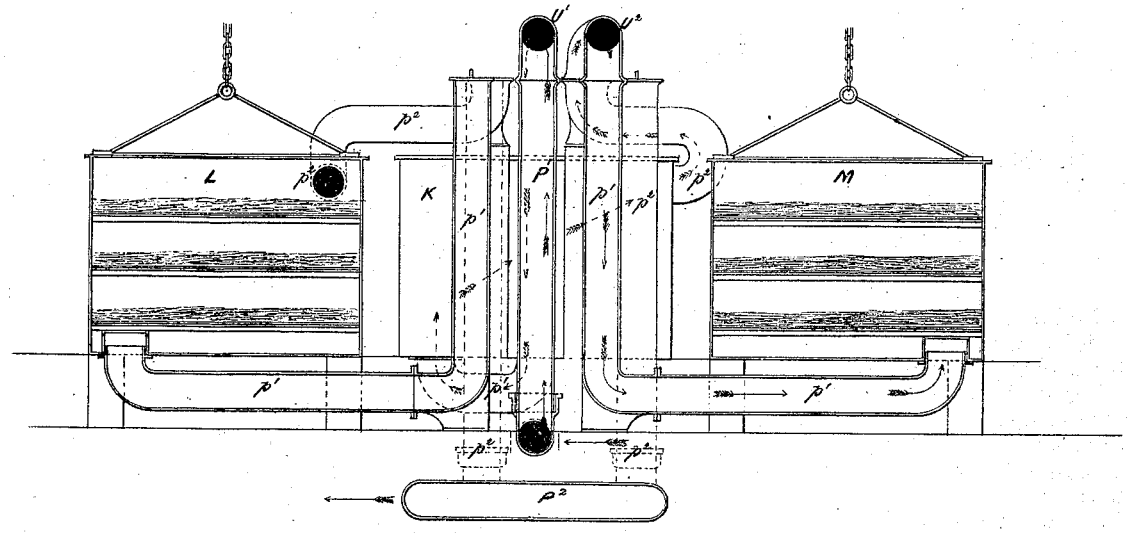

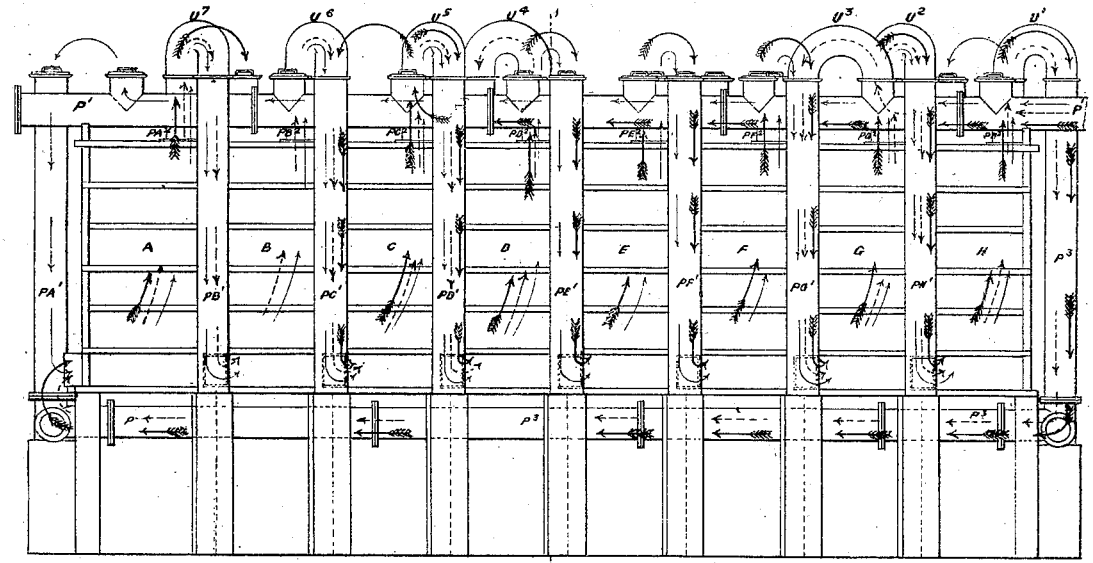
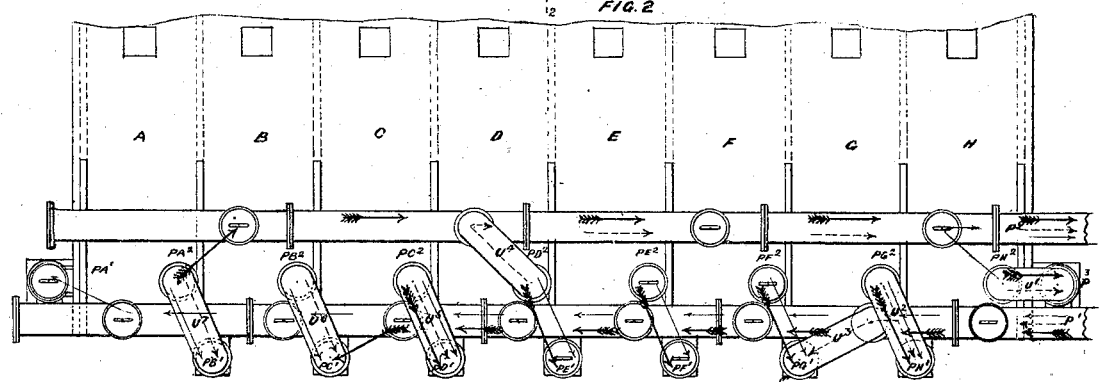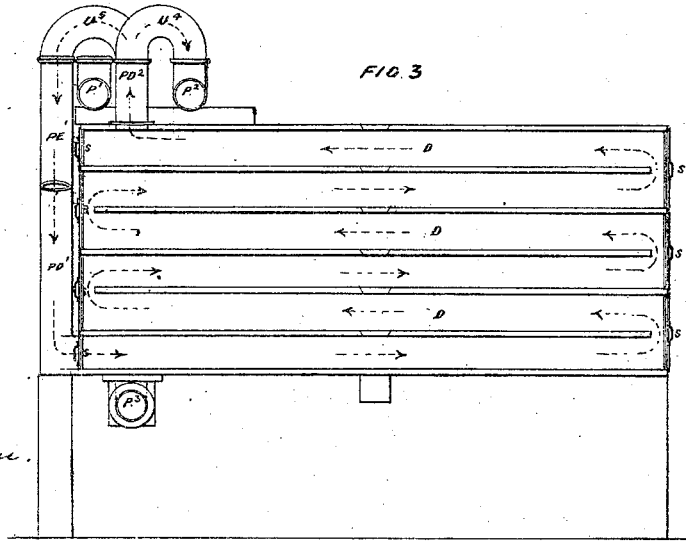

BLEACHING POWDER

H. Deacon's Patent

No. 118210

Witnesses:
C. B. Nottingham
R. R. Nottingham

Inventor:
Henry Deacon
by A. Pollok
his attorney

UNITED STATES PATENT OFFICE.

HENRY DEACON, OF WIDNES, ENGLAND.

IMPROVEMENT IN THE MANUFACTURE OF BLEACHING-POWDERS.

Specification forming part of Letters Patent No. 118,210, dated August 22, 1871.

*To all whom it may concern:*

Be it known that I, HENRY DEACON, of Appleton House, Widnes, in the county of Lancaster, England, alkali manufacturer, have invented "Improvements in the Manufacture of Bleaching-Powder by the use of Chlorine when Diluted with Inert Gases," of which the following is a specification:

My said invention relates to a mode of and arrangement of apparatus for the manufacture of bleaching-powder by the use of chlorine when diluted with inert gases. Bleaching-powder is made by exposing slaked quick-lime to chlorine. The chlorine is gradually absorbed by the lime. The object of the manufacturer is to saturate the lime with chlorine as strongly as possible, thereby producing strong bleaching-powder. But strong bleaching-powder usually gives off chlorine when exposed to the air, and is, therefore, difficult to make by the ordinary process, with chlorine largely diluted with air, nitrogen, and the like. Now, my invention consists in so arranging and working the apparatus in which the lime is exposed to the diluted chlorine that the gases containing most chlorine shall always pass over the lime which has already absorbed the most chlorine, while the most diluted chlorine always passes over the lime containing the least chlorine—that is to say, when the lime has absorbed some chlorine, and its avidity to absorb more is diminished, such gases only are to be presented to it as yield chlorine with the greatest ease; when the chlorine becomes largely diluted and the absorption of chlorine from the mass of gases becomes more difficult, lime only that possesses the absorbing power with the strongest avidity is presented to it.

In carrying out this invention I arrange layers of slaked lime in a series of chambers or shelves, and I have found in practice that, in order to effect the absorption of the chlorine to the greatest extent it is desirable that the trays containing the lime should be placed at a distance not greatly inferior to or much exceeding six inches. The gases entering at one end of the series pass over every surface of lime in succession until they issue at the end of the series. Thus a series of chambers or shelves, or chambers filled with shelves, are all charged with slaked lime, and are connected together in series. For illustration, this series may be called A B C D E F G, or fewer or more, as occasion may require, and each member of the series A B C D E F G may either be one shelf or one chamber, or any piece of apparatus containing one or more shelves. The gases enter A and pass over every surface of slaked lime in succession, and then enter B, when the same process is repeated, and so on through C D and to G. The chlorine is absorbed most in the first part of the series, and the slaked lime A gradually arrives at a point of saturation with chlorine depending in part upon the amount of chlorine in the dilute gases, and in part upon other circumstances well known to practical manufacturers, and not necessary to allude to further herein, while in B C D E F G both the slaked lime and gases will contain chlorine in gradually-lessening proportions, both the slaked lime and the gas which contain the least chlorine always being together. When this point of saturation is reached A is isolated and the gases are conveyed first to B, which then becomes the first of the series; A is emptied of the bleaching-powder it contains, and is recharged with fresh-slaked lime, and connected with G, and then becomes the last of the series B C D E F G A. Similarly, when B becomes saturated, isolated, emptied, and refilled the series will be C D E F G A B, and so on, each member in turn continuing the series. Instead of passing over surfaces of slaked lime or in combination therewith, and by preference after passing over the surfaces of the slaked lime or the shelves, or in the chambers, the diluted chlorine may be passed through layers of slaked lime arranged in series in vessels, in series in the same way as the layers of slaked lime are arranged in the dry-lime purifiers for coal-gas.

The pipes of the apparatus may be made of cast-iron, and the shelves or chambers holding the lime may be constructed of slate or stones, or of other suitable material, and all iron-work may be painted or varnished, as is well understood.

The changes of gas from one member of the series to another, and the isolation of each member of the series in turn for emptying and re-charging with slaked lime may be effected by movable valves or movable connecting-pipes suitably arranged and luted or jointed, as is well understood.

Diluted chlorine can be obtained by the means described in the specification of an invention for which Letters Patent were granted to me bearing date the 29th day of December, 1868, No. 85,370, or by the improved apparatus for the manufacture of chlorine described in the specification of an invention for which I am now applying for Letters Patent for the United States, this invention being intended to be used in combination with the said prior inventions hereinbefore referred to.

And in order that my said invention may be fully understood, I shall now proceed more particularly to describe the same, and for that purpose shall refer to the several figures in the annexed drawing, the same letters of reference indicating corresponding parts in all the corresponding figures. In this drawing I have shown as examples merely two out of many forms of apparatus which may be used for carrying out my improved system.

Figure 2:
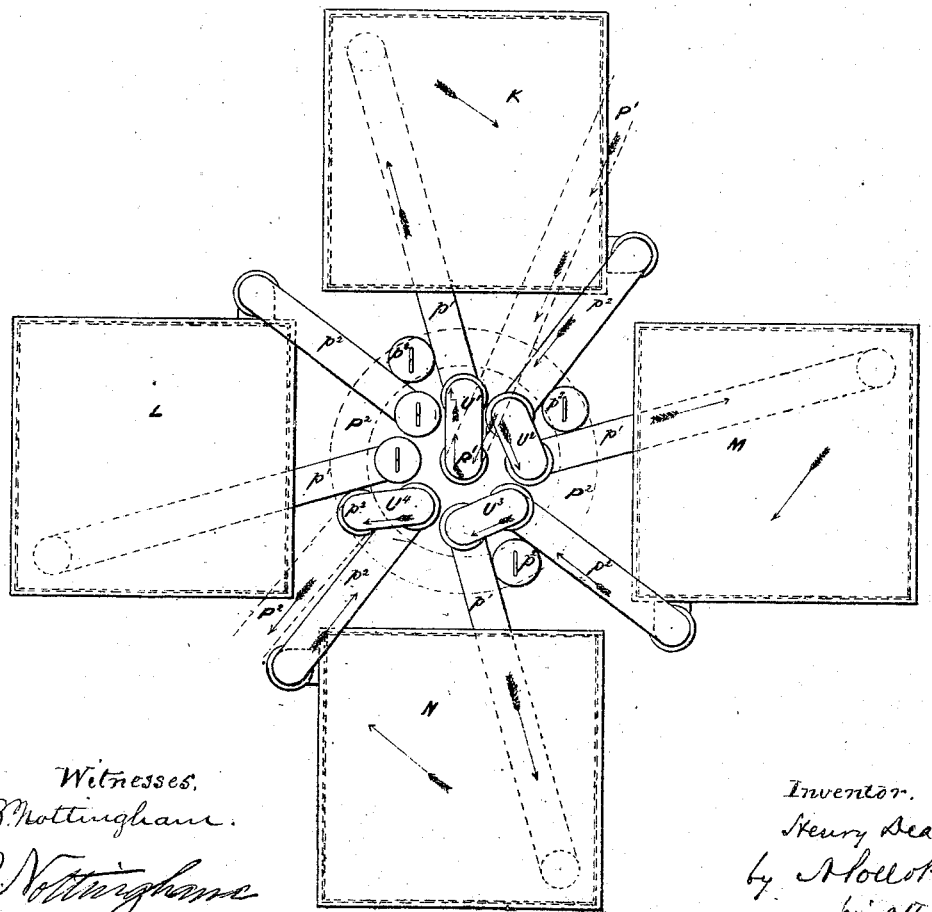

Figure 1, sheet 1, represents a front elevation of one arrangement of apparatus with the doors removed. Fig. 2 is a corresponding plan with the back portion of the chambers broken away, and Fig. 3 is a transverse section taken along the line 1 2 in Fig. 1. In this arrangement there is represented a series of eight chambers, lettered from A to H inclusive, each chamber containing six shelves or layers of lime, as shown in Figs. 1 and 3; but of course the same connection might be used if each chamber were used without shelves or with other number of shelves than six. As shown the chambers A B C D E F G H are constructed of slabs of slate, the pipes of cast-iron, and the doors closing the chambers of wrought-iron. The course of the current of gases is indicated by arrows of three different kinds to show how the series can be worked when the gases enter either of the three chambers A or C or G, as first of the series, and, for example, it is shown as circulating through all eight chambers, and through six chambers, and through seven chambers. When it enters chamber A first, as indicated by the fine-lined arrows, the series will be A B C D E F G H, and the gases will pass through all eight chambers. When entering chamber C first, as indicated by the thick-lined arrows, chamber B is shown isolated, and the series will be C D E F G H A, and similarly by the dotted arrows the series will be G H A B C D, the two chambers E and F being shown isolated, and similarly other changes of series can be effected in like manner. The horizontal pipe $P^1$ is the main entrance-pipe, and the pipe marked $P^2$ is the main outlet-pipe. $P^1$ is connected with the source of chlorine, and $P^2$ with the chimney or other outlet. Each chamber is furnished with connecting-pipes fixed to it to provide inlet and outlet-openings, as $P\ A^1$, $P\ A^2$, $P\ B^1$, $P\ B^2$, &c. $P^3$ I call a circulating-pipe, and its office will be evident upon tracing in turn the course of the current of gases as indicated by each set of arrows. The course of the currents is governed by the connecting-pipes $U^1$ $U^2$ $U^3$, &c. They are drawn as arranged for the currents indicated by the set of dotted arrows. The joints with the pipes $P^1$ and $P^2$, $P\ A^1$, $P\ A^2$, &c., are luted in the ordinary way. The openings of the pipes not connected by these U pipes are closed by suitable covers luted. When the directions of the currents are to be changed these connecting U pipes are to be correspondingly rearranged. The way in which this is done will be evident on following and comparing the courses of the set of arrows. The outlet-openings $P\ A^2$, $P\ B^2$, &c., are so placed with reference to the openings in the main $P^2$ that the same connecting-piece U can connect as required the same opening in the main with either of two openings into a chamber, as, for instance, a connecting-piece, $U^4$, is shown connecting the main $P^2$ with the outlet $P\ D^2$; but it can be turned, so that while the same end remains at the same opening in the main $P^2$ the other end can communicate with the outlet $P\ C^2$, instead of the outlet $P\ D^2$. The rest of the drawing needs no particular description. The wrought-iron doors are marked S.

Figs. 1 and 2, sheet 2, represent, respectively, in section and plan, another modification of apparatus for the same purpose. In this arrangement four pieces of apparatus are employed, in which the gases, instead of being passed over surfaces of slaked lime, are passed through layers of the material arranged on gratings or perforated shelves, resembling ordinary coal-gas purifiers, worked with dry lime. The vessels and shelves may be constructed of slate slabs, the covers of slates or of iron, and the inlet and outlet-pipes and mode of circulation may be arranged and worked, and each vessel be in turn isolated for filling and emptying as is practiced in ordinary gas-purifiers similarly arranged, or the circulation may be effected by the arrangement shown. There are four separate vessels shown, K L M N, but the number may be varied at pleasure. $P^1$ is the main central inlet-pipe, $P^2$ the main outlet-pipe. $P^1$ has only one opening, forming the center of a circle. $P^2$ has four openings, $p^2\ p^2$, each at equal distances round $P^1$. The branch inlet and outlet-openings $p^1$ and $p^2$ of the vessels K L M N are arranged round $P^1$ in two concentric circles. The movable connecting-piece $U^1$ is used to connect $P^1$ with the inlet-branch $p^1$ of each vessel K L M N in turn. $U^2$, $U^3$, and $U^4$ are other connecting-pieces which are moved as required to connect the outlet branch-pipe $p^2$ of each vessel with the inlet branch-pipe $p^1$ of the next vessel in the series. As shown, the vessel L is isolated, and the openings or pipes not in use are closed by luted lids. The arrows indicate the course the gases take in passing through the vessels K, M, and N in series, and it will be evident to any practical man how, by rearranging the connecting-pipes $U^1$, $U^2$, $U^3$, and $U^4$ the required rearrangement or isolation can be effected. This method of circulation can be applied to chambers, as shown in sheet 1, or the method shown in sheet 1 can be adopted in the apparatus shown in sheet 2, or the method in either case can be varied in many ways; but the methods shown I consider convenient for each purpose.

I claim—

1. The use, in the manufacture of bleaching-powder, of an apparatus wherein a series of surfaces of slaked lime is subjected to the action of passing currents of chlorine, mixed with other but inert gases, the series of surfaces or the series of members of the apparatus, which may each contain one or more such surfaces, being so connected together that each surface or each member of the series can become the first one of the series in rotation, and be isolated in turn for the purpose of being filled or emptied, as hereinbefore described, the entrance and exit of the current of gases being such that the first gases containing most chlorine are always presented first to the lime containing most chlorine, and the gases which are weakest in chlorine are presented to the freshest lime, so that both the lime and gases at any moment in the series shall contain chlorine in gradually-lessening proportions from the first to the last of the series, for the purpose specified.

2. The use alone, or in combination with the aforesaid series of surfaces, of apparatus wherein layers of slaked lime are exposed on perforated shelves or gratings to the action of currents of chlorine mixed with other but inert gases which pass through such layers of slaked lime in the same way that coal-gas is passed through layers of slaked lime in the ordinary dry-lime coal-gas purifiers, for the purpose specified.

3. The use of layers of slaked lime on perforated shelves or gratings, through which layers the currents of gases pass when arranged in series similar to that herein described for use with surfaces—that is to say, so arranged that each shelf or grating, or member containing one or more shelves or gratings, shall become the first one of the series in rotation, and be isolated in turn for filling and emptying, for the purpose specified.

4. The application and use of either one or of both of the aforesaid apparatus in combination with the methods of producing chlorine, for which Letters Patent for the United States were granted to me bearing date the 29th day of December, 1868, or in combination with the improved apparatus for the manufacture of chlorine described in the specification of an invention for which I am now applying for Letters Patent of the United States.

In testimony whereof I have signed my name to this application in the presence of subscribing witnesses.

HENRY DEACON.

Witnesses:
ALEXANDER WALKER,
JOHN HOWARD.